US006418484B1

(12) United States Patent
Radia (10) Patent No.: US 6,418,484 B1
(45) Date of Patent: Jul. 9, 2002

(54) METHOD OF REMOTELY EXECUTING COMPUTER PROCESSES

(75) Inventor: Sanjay R. Radia, Fremont, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/261,518

(22) Filed: Jun. 17, 1994

(51) Int. Cl.⁷ ................................................. G06F 9/54
(52) U.S. Cl. ........................ 709/316; 709/228; 709/330
(58) Field of Search ................................ 395/650, 700, 395/670; 370/85.13; 364/200; 709/316, 228, 330

(56) References Cited

U.S. PATENT DOCUMENTS 5,187,786 A * 2/1993 Densmore et al. ............. 707/3
5,428,782 A * 6/1995 White ......................... 709/101
5,577,252 A * 11/1996 Nelson et al. ............... 395/670

FOREIGN PATENT DOCUMENTS

GB          0474339 A3 * 11/1992 ............. G06F/9/44

OTHER PUBLICATIONS

Smith, Jonathan M., "A Survey of Process Migration Mechanisms", Operating Systems Review, ACM Press, vol. 22, No. 3, pp. 28–40, Jul. 1988.*
Zondag, E. G., Hierarchical Management of Distributed Objects, Technische Univ. Twente, Enschede (Netherlands). Dept. of Computer Science., Corp. Source Codes: 090700004; U1294434 Sponsor: National Aeronautics and Space Administration, Washington, Nov. 1990.*
Orfali, Robert, Dan Harkey, "Client/Server Survival Guide with OS/2", Van Nostrand Reinhold, pp. 785–812, 1994.*
Radia, Sanjay, Jan Pachl, "The Per–Process view of Naming and remote execution", IEEE Parallel & Distributed Technology, pp. 71–79, 1993.*
"The Per–Process View of Naming and Remote Execution", Radia et al., IEEE Parallel & Distributed Technology Systems & Applications, Aug. 1993, pp. 71–80.
"Naming Policies in the Spring System", Sanjay Radia, Proceedings First International Workshop on Services in Distributed and Networked Environments, Jun. 27–28, 1994, pp. 164–171.

* cited by examiner

Primary Examiner—St. John Courtenay, III
(74) Attorney, Agent, or Firm—Arter & Hadden LLP (57) ABSTRACT

A method of remotely executing a computer process between a parent computer initiating the process and a child computer executing the process. In one embodiment the process includes a step of associating objects with representations having specific object bindings dependent on the site of process of execution. The same representation has a first object binding if the process is executed on the parent computer, and a second object binding if the process is executed on the child computer. The set of objects associated with these location dependent representations may include objects resident at both the parent and child computers. Additional objects may be associated with a second set of representations having object bindings dependent upon the network site of process execution to accommodate remote process executions across two or more computer networks. In an alternative embodiment, objects are associated with multiple representations in an ordered merge directory. Some of the representations within said multiple representations are also dependent on the site of remote process execution. Processes may then access objects resident at a site of process execution, or access objects resident at sites proximate the site of remote process execution.

16 Claims, 6 Drawing Sheets

| | |
|---|---|
| OBJ1 | MACHINE x/OBJ1 |
| OBJ2 | MACHINE x/OBJ2 |
| OBJ3 | MACHINE x/OBJ3 |
| OBJ4 | LOCAL MACHINE/OBJ4 |
| OBJ5 | LOCAL MACHINE/OBJ5 |
| OBJ6 | LOCAL MACHINE/OBJ6 |
| OBJ7 | NETWORK x/OBJ7 |
| OBJ8 | NETWORK x/OBJ8 |
| OBJ9 | NETWORK x/OBJ9 |
| OBJ10 | LOCAL NETWORK/OBJ10 |
| OBJ11 | LOCAL NETWORK/OBJ11 |
| OBJ12 | LOCAL NETWORK/OBJ12 |
| OBJ13 | LOCAL MACHINE/OBJ13 |
| | +LOCAL NETWORK/OBJ13 |
| | +NETWORK x/OBJ13 |
| | +MACHINE x/OBJ13 |
| LOCAL MACHINE | MACHINE x |
| LOCAL NETWORK | MACHINE x |
| MACHINE x | CONTEXT AT MACHINE x |
| NETWORK x | CONTEXT AT NETWORK x |

Fig. 6A

| | |
|---|---|
| OBJ1 | MACHINE x/OBJ1 |
| OBJ2 | MACHINE x/OBJ2 |
| OBJ3 | MACHINE x/OBJ3 |
| OBJ4 | LOCAL MACHINE/OBJ4 |
| OBJ5 | LOCAL MACHINE/OBJ5 |
| OBJ6 | LOCAL MACHINE/OBJ6 |
| OBJ7 | NETWORK x/OBJ7 |
| OBJ8 | NETWORK x/OBJ8 |
| OBJ9 | NETWORK x/OBJ9 |
| OBJ10 | LOCAL NETWORK/OBJ10 |
| OBJ11 | LOCAL NETWORK/OBJ11 |
| OBJ12 | LOCAL NETWORK/OBJ12 |
| OBJ13 | LOCAL MACHINE/OBJ13 |
| | +LOCAL NETWORK/OBJ13 |
| | +NETWORK/OBJ13 |
| | +MACHINE/OBJ13 |
| LOCAL MACHINE | MACHINE y |
| LOCAL NETWORK | NETWORK y |
| MACHINE x | CONTEXT AT MACHINE x |
| NETWORK x | CONTEXT AT NETWORK x |
| MACHINE y | CONTEXT AT MACHINE y |
| NETWORK y | CONTEXT AT NETWORK y |

Fig. 6B

METHOD OF REMOTELY EXECUTING COMPUTER PROCESSES

FIELD OF THE INVENTION

The present invention relates to methods of executing computer processes and, more particularly, to methods of remotely executing computer processes.

BACKGROUND OF THE INVENTION

Remote execution involves the execution of a computer process at a processor site other than the one initiating the process. In general terms processes may be regarded as including various actions such as the execution of a computer program, invocation of a system service or an interaction with a user. The computer initiating the remote execution is typically called the parent. The remote computer actually executing the process is normally referred to as the child. An example of remote execution is the situation where a user employs a home computer to run a program on another computer, such as a work station, back at the office.

Remote execution is advantageous in a variety of circumstances such as, for example, when hardware requirements dictate use of a more sophisticated remote processor. Remote execution can also be beneficial in instances where data or software transmission time and costs exceed those associated with simply operating the child computer remotely. If, for example, a user at home wished to work on a large database resident at a work station back at the office, the cost of transmitting the entire database to the home computer could be avoided by instead remotely executing the database software at the office work station. In some instances software licensing restrictions may also dictate that a process be executed at a specific computer site having a duly authorized copy of the software. The office work station may, for example, have a licensed version of an expensive commercial software package installed. Installing the same software on the user's home computer, however, might be a violation of the software license agreement unless another copy of the software is purchased for the home computer.

It is normally desirable for remote execution of a process to be network transparent. That is, the user at the parent computer should be able to run a program on the child computer in the same way as if the program were running on the parent computer, and should be able to obtain the same results. In some instances an opposite effect may be desired, so that remote execution of a process at a child computer is explicitly apparent to the user. This latter situation is termed non-transparent remote execution. In still other circumstances some aspects of the process preferably appear the same to the user (as if the process were running at the parent computer instead of at the child computer) while other aspects of the process should explicitly reflect their remote execution. This type of remote execution is usually termed semi-transparent. A semi-transparent type of remote execution may be desired, for example, when a user at their home computer wishes to execute a command at a computer site or location other than the home or office, but still make use of resources that are resident at the home or office computer and absent from the remote site of process execution.

During either local or remote execution most processes typically access various objects such as files, devices and system services. These objects are normally accessed through some form of representation, typically referred to as their name. An object name is commonly thought of as being bound to the object accessed through that name. In the case of transparent remote execution, objects are accessed through same representations, or names, irrespective of whether the process is being executed remotely at the child computer or locally at the parent computer. In the case of semi-transparent remote execution, at least some objects (involving those aspects of the process that are to appear the same to the user) are preferably accessed through the same names during either local execution at the parent computer or remote execution at the child computer.

In most distributed systems there is commonly a set of objects resident at each computer in the system. Each computer may, for example, employ the same operating system or word processing software package. Such objects are normally termed generic. During remote execution of a process on a child computer it is generally desirable for the remote process to access the generic objects resident at the child computer directly from the child computer. At the same time other objects, resident only at the parent computer, should still be accessed from the parent. Some objects such as data files may reside only at the parent computer. Accessing generic objects at the site of execution is usually regarded as more efficient, since the object need not be transferred from the parent computer to the child computer. Accessing other non-generic objects from the parent computer provides the desired name transparency for remote execution that is to be of the transparent or semi-transparent form. Unfortunately, however, most conventional naming schemes do not easily facilitate transparent or semi-transparent forms of remote execution that permit accessing objects from more than one computer site.

A majority of conventional computers typically employ a per-system naming scheme. Each computer has its own hierarchical naming tree containing component names through which objects are accessed. A particular document in a DOS based personal computer, for example, might be accessed through the name "c:\doc.1". The same name, however, may represent separate objects on separate computers. By way of example office-coworkers may have different versions of the same document on their respective computers. While each version of the document is a separate object, both of these objects may have the same "c:\doc.1" name. Accordingly per-system naming schemes normally can only access objects resident at either the child computer or the parent computer, but not both. Thus per-system naming schemes generally are not sufficiently flexible to facilitate the most useful forms of transparent and semi-transparent remote execution.

An alternative to per-system naming schemes are the per-process naming schemes. In per-process naming schemes each computer process has its own set of name-to-object associations, or name bindings. These bindings are again typically organized in a hierarchical naming tree. Each computer on which a process is executed may also have a set of name bindings organized in a naming tree. The naming tree of a computer is normally attached to the naming tree of those processes that are executed on that computer. While each process normally has its own independent set of name bindings, many bindings may be shared between processes. One example of a per-process naming scheme is the EPort distributed environment, developed in part by the inventor herein. In the EPort environment computers are grouped into divisions. There is normally a high degree of sharing between computers within a division, but limited sharing across divisions. Each computer in the EPort environment possesses its own set of name bindings for objects resident at that computer, typically organized in a hierarchial naming tree. Each division has also its own hierarchial naming tree for objects that are shared among the computers within that division. Each process in EPort has its own root node to which it attaches the naming trees of various subsystems, such as the naming trees of individual computers and divisions. Typically, an EPort process attaches the naming tree of the computer and division within which the process resides. An EPort process can also attach the naming trees of other subsystems during remote execution.

Transparent and semi-transparent remote execution may normally be performed using per-process representation schemes such as EPort. During remote execution the set of name bindings of the parent process at the parent computer is passed to the child process at the child computer. Some changes, however, are made in the copy of the parent name bindings transferred to the child. The name bindings of some objects, such as the bindings of objects generic to both the parent and child computers, are changed to point to the child computer. That is, the name bindings of these objects are changed so that the objects may be accessed by the child process directly from the child computer, rather than from the parent computer. The name bindings to be changed may be specified in one of several ways. One method of specifying the desired name changes involves maintaining a list of objects in an appropriate system, such as a remote execution server. For example, a list of generic objects may be maintained in this fashion so that generic objects are always accessed from the site of process execution, whether the process is executed locally at the parent computer or remotely at the child computer. As an alternative method of specifying desired name changes, a user may explicitly designate any additional objects that should be accessed at the child computer through changes to the name bindings of the parent process. That is, the user may expressly make the changes to the name bindings his, or her, own self.

Regrettably, conventional per-process naming schemes still suffer from a number of disadvantages relating to remote execution. If the names of generic objects are changed, or if new generic objects are added to the parent and child computer systems or older generic objects deleted, then the data files of the remote execution server must be altered to reflect these changes. Alternatively, the user must specify the required changes in the set of objects to be accessed by the child process by remote execution. Changes in the set of generic objects are usually found to occur as a distributed computing system evolves. These changes, however, are normally viewed as non-trivial and highly inconvenient. Changes to the data files of a remote execution server are undesirably burdensome for system administrators. User specified changes are, in turn, viewed as a considerable burden to users who are not sophisticated computer experts.

Thus, there still exists a need for an improved method of implementing remote process execution that facilitates transparent and semi-transparent execution, but does not require modification of the remotely executing process or modification of remote execution servers, as objects in a distributed computer system are added, deleted or changed. The present invention finally fulfills this need.

SUMMARY OF THE INVENTION

Broadly, and in general terms, the present invention provides a method of remote execution that greatly facilitates transparent and semi-transparent execution. Additionally, generic objects may be accessed by a remotely executing process at the remote site of process execution while objects resident only at the parent computer are still accessible to the remotely executing process. All of these goals are achieved without requiring modification to distributed system level services, such as remote execution servers, whenever sets of generic objects are added, deleted, or otherwise modified. The invention is applicable to any system that supports remote execution. The invention may be applied between two or more computers whether or not the computers are part of a network and may also be applied to parent and child computers residing in different networks.

In accordance with one embodiment of the present invention generic objects and the like are associated with representations, or names, having specific object bindings dependent upon the computer site of process execution. While the name associated with an object remains constant, the specific object binding for that name changes depending on which computer is executing the process. The same name may have a first object binding if the process is executed on the parent computer, but a different object binding if the process is executed on the child computer. The objects associated with these execution site dependent names include objects having instances, or copies, that are resident on both the parent and child computers. The present invention thus facilitates transparent and semi-transparent remote execution by providing a method through which processes may obtain generic objects and the like from the site of process execution without requiring additional changes to the representation, or name, of the objects while still allowing access to other objects from the parent computer so as to provide a desired degree of transparency.

The method of the invention may also be applied to parent and child computers residing in different networks. In the case of remote execution across computer networks some of the objects accessed by a process during execution typically reside at both the local and remote network server. These objects may be termed network generic. In accordance with another embodiment of the present invention, appropriate objects are associated with names having object bindings dependent upon which network includes the computer executing the process. This second set of objects may include network generic objects. Advantage may then be taken of both the processor generic objects resident at both the parent and child computers as well as the network generic objects resident at both the parent and child networks. In this embodiment processes executing remotely at the child computer can locally access both network and computer generic objects.

In yet a further embodiment of the invention appropriate objects are associated with an ordered merger directory including representations having object bindings depending on, and pointing to, the site of process execution. Objects in this third set are then accessed either directly from the computer site of remote process execution, or from processor sites proximate the site of process execution. An ordered merge directory provides multiple representations through which an object may be accessed, each representation usually having a different object binding. If an object can not be accessed through a first representation in an ordered merge directory, further representations may be utilized until the object is successfully obtained.

The invention may be implemented by, for example, a process execution server operating with a per-process naming scheme. In operation a copy of a parent context is made by the execution server when a process is to be executed. This copy of the parent context may be termed the child context. The process to be executed may be termed the child process. The parent context includes at least one representation referring to a local processor site. This local processor site representation has an object binding that is changed dependent on the site of process execution. Initially this local processor site representation is bound to the parent computer. After the child context, the copy of the parent context, is made a determination is made by the process server as to whether execution of the child process is to occur locally at the parent computer or remotely at the child computer. If execution is local at the parent computer, the child context is simply passed to the child process. If execution is to be remote at the child computer, the object binding of the local site representation in the child context is changed to point to the child computer at which the process will be remotely executed. A context of the child computer is also added to the child context. This changed and supplemented child context is then passed to the child process that is being remotely executed at the child computer. If remote execution occurs across networks, changes are also made in the child context to a representation referring to the local network site of the process execution. This local network site representation is also changed to point to a network server of the child computer's network. A copy of the child's network server context is also added to the child context.

The present invention thus provides a method of transparent and semi-transparent remote execution between a parent computer initiating a process and a child computer executing the process. Processes remotely executed in accordance with the present invention are further able to access objects at sites hierarchically proximate the site of remote process execution. Modification of remote execution servers or other administrative level system services is not required each time objects are added to or deleted from the parent and child computers or their respective networks, or when object names are changed. Still further goals, objects and aspects of the present invention will be better understood by review of the figures herein, and the following detailed description of the invention.

DETAILED DESCRIPTION OF THE PREFERRED EMBODIMENT

Figure 1:
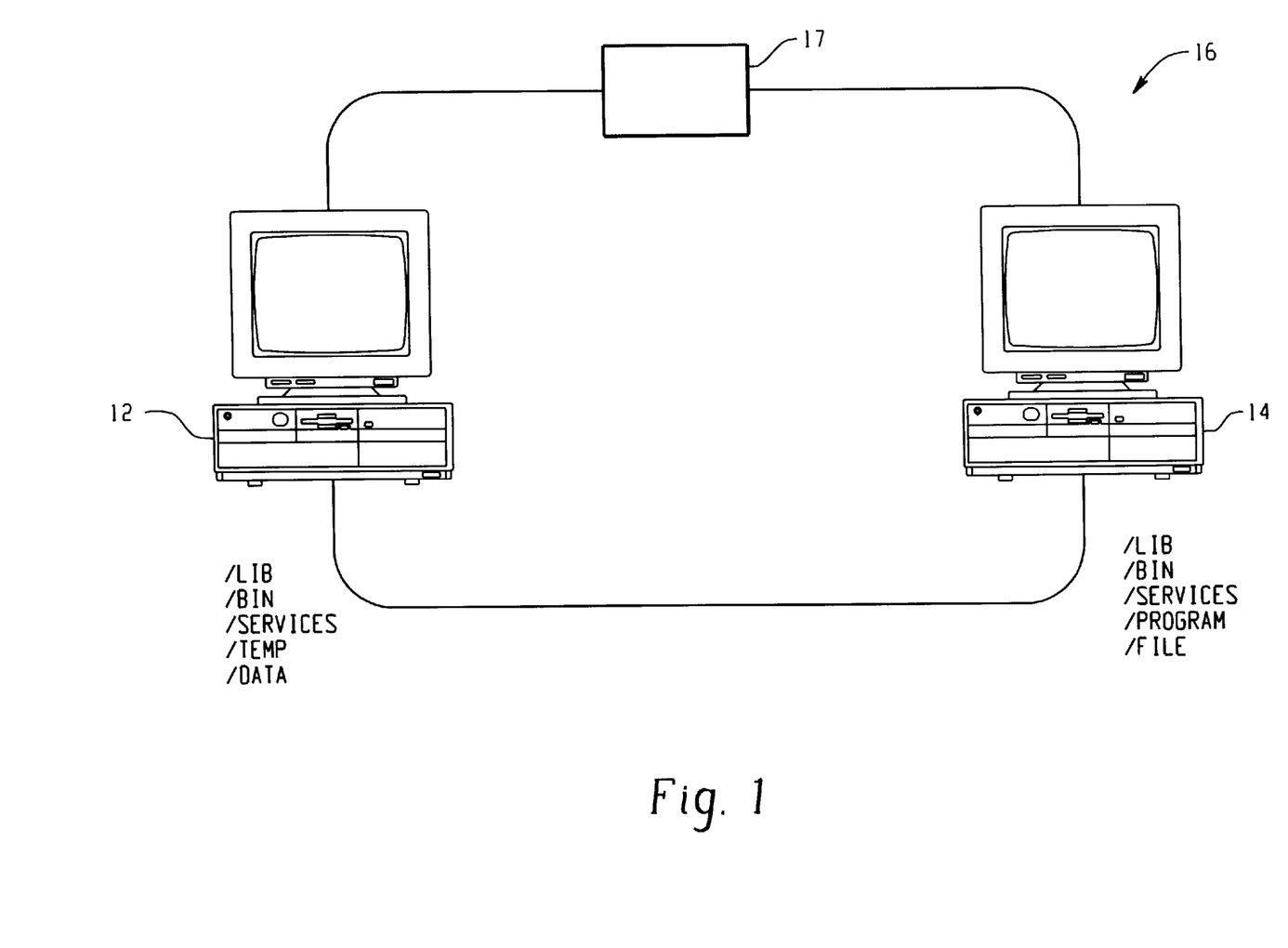
FIG. 1 is a generalized illustration of a remote execution between two computers.

Referring to the figures, and more particularly to FIG. 1, there is shown a generalized representation of a remote execution occurring between a parent computer 12 and a child computer 14. The parent computer 12 initiates execution of a process on the child computer 14. The parent and child computers 12 and 14 may belong to a network 16 that is supported by a server 17 as illustrated in FIG. 1. Alternatively, the parent computer 12 may be in communication with the child computer 14 through some other mechanism, such as a modem. As further illustrated, various sets or directories of objects such as "/lib", "/bin", and "/services" are resident at both the parent computer 12 and child computer 14, and are thus generic. Other objects, such as "/temp" and "/data" may be resident on the parent computer 12 but not on the child computer 14. While objects associated with the names "/temp" and "/data" may reside at the child computer 14, these names usually are not bound to the same objects as the same name bindings of the parent computer 12. Similarly, objects such as "/program" and "/file" may be resident on the child computer 14 but not on the parent computer 12. During either local or remote execution, a process will access some or all of these objects. It is preferable to have the process access generic objects such as "/lib" and "/bin" from the computer site of execution. Thus, for example, if the process is being remotely executed at the child computer 14 it is preferable to have the process access the generic objects such as "/lib" and "/bin" from the child computer 14 rather than from the parent computer 12. Alternatively, during local execution of the process at the parent computer 12 it is preferable to have the process access the same generic objects from the parent computer 12 rather than the child computer 14.

Objects are accessed by computer process through a representation, or name. Each name has an object binding to the specific object that is accessed by the process through that name during execution. In accordance with one embodiment of the present invention, some objects are associated with names having specific object bindings that are dependent on which computer executes the process. The name associated with the object remains constant. The object binding, and the specific object accessed by the process through the name, changes depending on the computer site of process execution. In this embodiment the computer site dependent object bindings are made to point to the computer site of process execution.

By way of example an object termed "OBJ" may be resident on both the parent 12 and child 14 computers. Each instance of "OBJ", one on the parent computer 12 and one on the child computer 14, is a separate object. In accordance with the invention, this object "OBJ" may be associated with a name or other representation such as "local machine/OBJ", having an object binding dependent upon the computer site of process execution. When the process is executed on the child computer 14, the name "local machine/OBJ" is bound to the object "OBJ" resident at the child computer 14. The process then accesses the specific object "OBJ" on the child computer 14 through this name. If the process is executed on the parent computer 12, however, the representation "local machine/OBJ" is now bound to the object "OBJ" resident on the parent computer 12. The process (being executed on the parent computer 12) now accesses the specific object "OBJ" on the parent computer 12 through the representation "/local machine/OBJ".

In accordance with this embodiment of the invention, objects that are generic between the parent 12 and child 14 computers may advantageously be associated with names that are dependent upon the computer site of process execution. Transparent remote execution is thus facilitated since the name remains the same, and is used by the process in the same way, whether execution of the process is local or remote. As new objects are added to the parent and child computer systems, further changes are not required in the systems responsible for implementing remote execution. This system may, for example, be a remote execution server. The objects are simply added to the appropriate systems with names or other representations having object bindings that are dependent upon the computer site of process execution.

The association of objects with names or other representations that are dependent on the site of process execution may be characterized as a symbolic linking of the objects to their related names. The name used to access the object is symbolically linked a name that points to separate instances of the object depending on the site of process execution. An object termed "OBJ" is symbolically linked to the name "/local machine/OBJ". This name "/local machine/OBJ" is in turn bound to a first instance of the actual object termed "OBJ" resident at the parent computer 12 during local execution of a process, and is also bound to a second and separate instance of the object termed "OBJ" resident at the child computer 14 during remote execution. Thus while the term "/local machine/OBJ" remains constant, the specific object bound to this name is seen to be dependent on the site of process execution. Due to the symbolic linking, the specific object bound to the name "OBJ" is dependent on the site of process execution.

Figure 2:
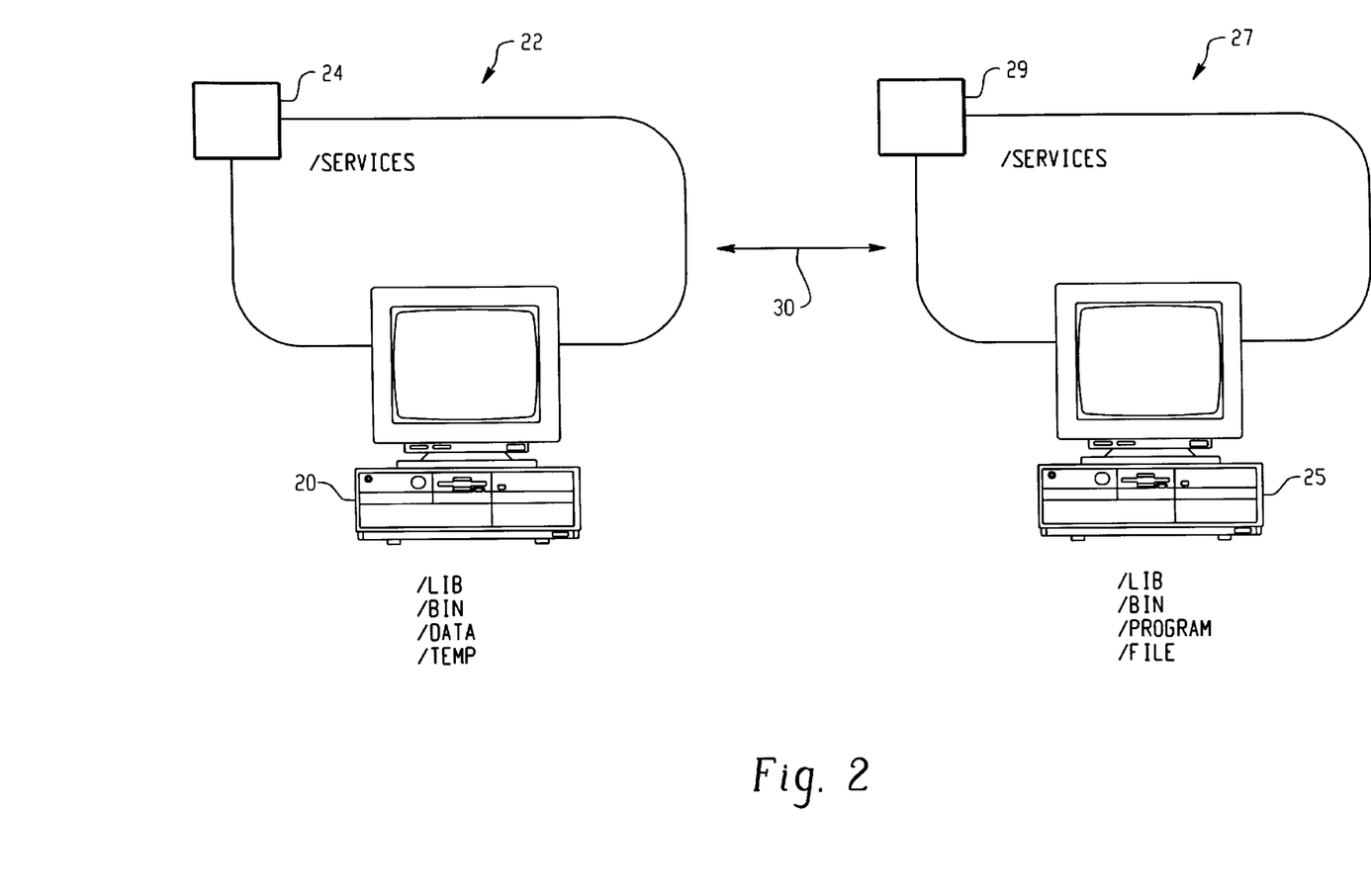
FIG. 2 is a generalized illustration of a remote execution between two computers in separate networks.

As noted above this embodiment of the present invention may be implemented between any two computers configured for remote execution of a process. The computers may, but need not necessarily, be networked. The present invention may also be employed in remote executions occurring between parent and child computers belonging to different networks. Referring to FIG. 2 there shown a parent computer 20 belonging to a first network 22 that is supported by a server 24 and a child computer 25 belonging to a second network 27 supported by a server 29. The parent computer 20 and child computer 25 exchange information through a communications link 30. During remote execution some of the objects accessed by a process may be resident at the respective network servers 24 and 29 rather than at the parent computer 20 or child computer 25. As shown in FIG. 2, for example, a directory of objects termed "/services" may be resident on both the first network server 24 including the parent computer 20 and also resident on the second network server 29, including the child computer 25. In the case of network generic objects it is preferable for the remotely executing process to access objects from sites in closest proximity to the site of process execution. For example, during remote execution of a process at the child computer 25 the object "/services" is preferably obtained from the second network server 29 rather than the first network server 24.

In accordance with another embodiment of the invention, another set of objects may be associated with names having object bindings dependent upon which network includes the computer executing the process. Network generic objects, those residing at both the network of the parent computer and the network of the child computer, may be included in this second set of objects. By way of example a set of objects such as "/services" may be resident at both the network server 24 of the parent computer 20 and the network server 29 of the child computer 25. In accordance with this aspect of the invention the objects named "/services" may be associated with network dependent names such as "/local network/services." In operation, the name "/local network/services" is bound to the set of the objects "services" that is resident at the parent server 24 if a process is executed locally at the parent computer. This same "/local network/services" name is alternatively bound to instances of the same set of objects "services" that is resident at the child server 29 when a process is executed remotely at the child computer 25. In this manner objects accessed by a remotely executing process may be obtained from sites proximate the computer site of process execution.

In accordance with still a further embodiment of the present invention, another group of objects is associated with multiple names or representations referred to as an ordered merge directory. Several names are associated with each object. A process then attempts to access an object through these multiple names in a specified order. If an object cannot be accessed by the process through the first of the multiple names, then access to the object is attempted through the remainder of these multiple names until the object is finally accessed. In this embodiment the multiple names of the ordered merge directory further includes names having object bindings dependent upon the computer site of process execution.

Since some of the names within the set of multiple names are dependent on the computer site of process execution, a remotely executing process may first attempt to access an object at the child computer. If the object is not resident at this site, then subsequent representations within the multiple representations will be applied until the object is finally accessed. The ordered merge directory may also include name bindings to each site at which the object may reside, thus assuring that a process will have access to a desired object irrespective of its location.

In some instances various objects may reside at some but not all computers potentially involved in various remote executions. For example, some objects may reside on some but not all, of the computers in a network. Such objects may be termed "quasi-generic." In accordance with this embodiment of the present invention, objects such as quasi-generic objects may be accessed at the site of remote process execution or, alternatively, from a site in closest proximity to the site of process execution.

Figure 3A:
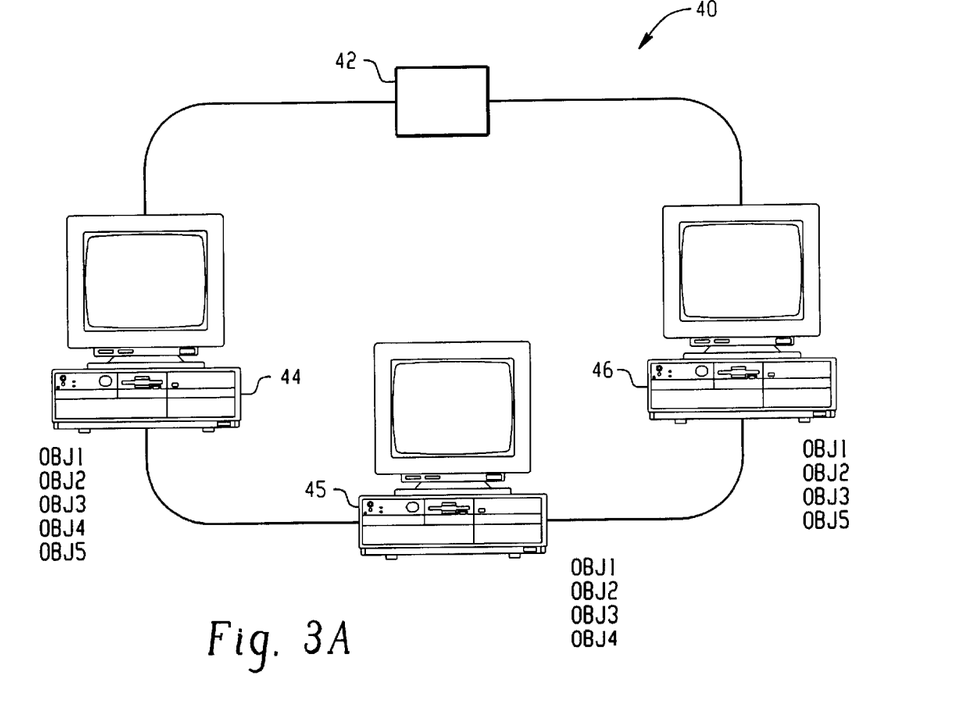
FIG. 3 is a generalized illustration of several computers in a network potentially involved in remote executions.

By way of example there shown in FIG. 3A an exemplary computer network 40 supported by a server 42 and including processors 44, 45 and 46. It should be understood, however, that this embodiment of the invention is not limited to network applications. For purposes of illustration and explanation, computer 44 may be viewed as a parent computer remotely executing process at either of child computers 45 or 46. A set of objects identified as "OBJ1", "OBJ2", "OBJ3", "OBJ4" and "OBJ5" can be seen to reside at parent computer 44. The object identified as "OBJ5", however, is not resident at child computer 45 and the object "OBJ4" is absent from child computer 46. These two objects, "OBJ4" and "OBJ5", may be viewed as semi-generic.

In accordance with this embodiment of the present invention the semi-generic objects "OBJ4" and "OBJ5" are symbolically linked with an ordered merge directory including an object binding that is dependent on the site of process execution. Thus "OBJ4" would be associated with the multiple names "OBJ4=/local machine/OJB4: /machine/OBJ4". An order of access would also be provided, specifying that the first name should be employed to access the object before the second name is employed to access that object. An example of an ordered merge directory is graphically illustrated in FIG. 3B. The same symbolic linking would also be performed for "OBJ5".

Figure 3B:
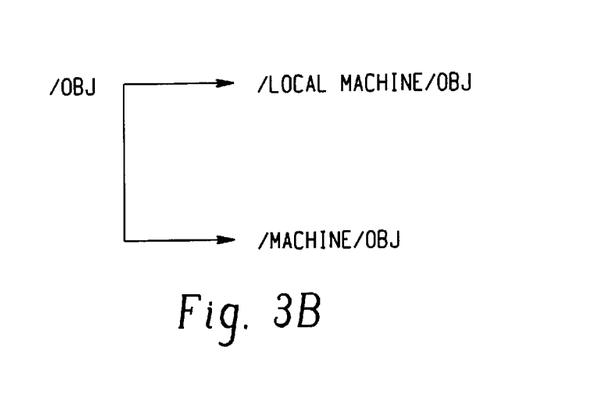

In this example the first name in the ordered merge directory "/local machine/OBJ4" is dependent on the site of process execution. If a process were executed locally at the parent computer 44, then the name "/local machine/OBJ4" would have an object binding to the parent computer 44. If a process were remotely executed at the child computer 45, however, then the same name "/local machine/OBJ4" would have an object binding to the child computer 45. The second name in the ordered merge directory, "/machine/OBJ4" is left unchanged as the site of process execution changes. Typically the name "/machine/OBJ4" always refers to the parent computer 44 to maintain transparency during remote execution. In this manner the problems of per-system naming schemes relating to different objects on the parent computer 44 and child computer 46 having the same name are avoided in the invention.

During remote execution a process accesses an object through the ordered merge directory by employing each name in the ordered merge directory in a specified order until the object is obtained. Continuing with the above example, a process remotely executed at the child computer 45 would first attempt to access "OBJ4" through the name "/local machine/OBJ4". Since this name has an object binding that is execution site dependent and that points to the child computer 45, "OBJ4" would be obtained from the child computer 45, the site at which the process is being remotely executed. A process remotely executed at the child computer 46, however, would find that "OBJ4" is not resident at the child computer 46. Access to "OBJ4" would then be attempted through the second name "/machine/OBJ4". Since this name has a binding to the parent computer 44, the site initiating the remote execution access to "OBJ4" would still be successfully achieved. If a process were locally executed at the parent computer 44, the name "/local machine/OBJ4" would have an object binding to the site of execution, the parent computer 44, and use of the second name in the ordered merge directory would not be required.

By way of further explanation of the first embodiment of the invention discussed further above, the objects "OBJ1", "OBJ2" and "OBJ3" are generic to all three computers. These objects could therefore be symbolically linked with a name having an object binding dependent on the site of process execution. For example, "OBJ1" could be symbolically linked with the name "/local machine/OBJ1". The object binding "/local machine" being dependent on, and made to point to, the site of process execution. During local execution at the parent computer 44 the term "/local machine/OBJ1" could be bound to the parent computer 44 so that "OBJ1" would thus be obtained from the parent computer 44. During remote execution at child computer 45, for example, the term "/local machine/OBJ1" could instead be bound to the child computer 45 and so that "OBJ1" would be obtained from the child computer 45 remotely executing the process. Alternatively, if remote execution were performed at child computer 46, the name "/local machine/OBJ1" could be bound to that child computer so that "OBJ1" would be obtained from child computer 46.

Figure 4A:
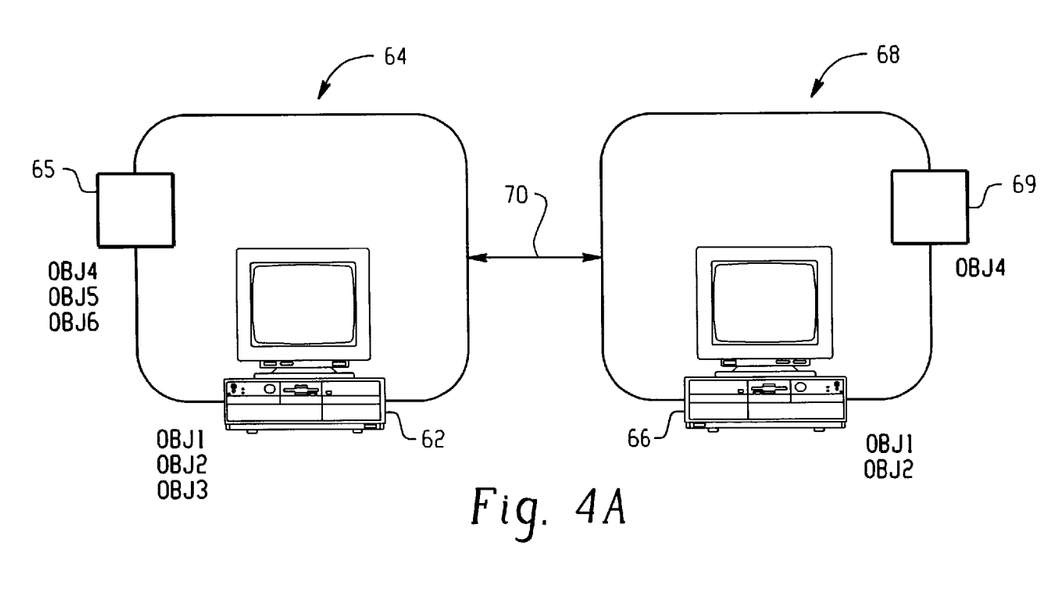
FIG. 4 is a generalized illustration of several computers in separate networks potentially involved in remote executions.

The present embodiment of the invention involving an ordered merge directory may include more than one name having an object binding dependent on the site of process execution. Such instances can advantageously facilitate transparent and semi-transparent remote execution across networks. Referring to FIG. 4A another illustrative example is shown involving a parent computer 62 in a first network 64 supported by a first server 65, along with a child computer 66 in a second network 68 supported by a second server 69. The two networks exchange information through a communications link 70. As shown, various objects entitled "OBJ1" through "OBJ6" are seen to be resident at various processor sites, including both the parent and child computers 62 and 66 as well as the first and second network servers 65 and 69. Not all objects are resident at all sites, however. For example "OBJ3" can be seen to be resident only at the parent computer 62 while "OBJ5" is resident only at the first network server 65.

In accordance with this embodiment the invention, objects to be accessed during remote execution may be associated with an ordered merge directory having multiple site dependent object bindings so that objects may be accessed either at the site of remote process execution, or at sites proximate the execution site. In the present example any of the objects "OBJ1" through "OBJ6" discussed above are associated with an ordered merge directory that may generally be characterized by the representation "/OBJ=/local machine/OBJ:/local network/OBJ:/network/OBJ:/machine/OBJ". A graphical illustration of this ordered merge directory is presented in FIG. 4B. In this example the name "/local machine/OBJ" is dependent on, and points to, the processor site of execution. If a process is executed at the parent computer 62 the name "/local machine/OBJ" has an object binding to the parent computer 62. If a process is executed at the child computer 66 the name "/local machine/OBJ" has an object binding to the child computer 66. The name "/local network" similarly has an object binding that is dependent on, and points to, the network site of process execution. If a process is executed at any of the computers in the first network 64 that includes the parent computer 62, the name "/local network" has an object binding to the first network server 65. If a process is remotely executed at any of the computers in the second network the name "/local network" has an object binding to the second network server 69. To maintain transparency during remote execution the name "/network" always has an object binding to a specific network, typically the network in which the parent computer 62 resides. Similarly the name "/machine" is always bound to a specific computer, normally the parent computer 62 initiating the remote execution.

Operation of the ordered merge directory described above and illustrated in FIG. 4B can be better understood by way of example. A process remotely executed at the child computer 66 would obtain an object such as "OBJ1" from the ordered merge directory by first employing the name "/local machine/OBJ1". Since the process execution dependent name "/local machine" would be bound to the child computer 66 during remote execution, "OBJ1" would therefore be obtained directly from the child computer 66, the site of process execution. A process remotely executed at the child computer 66 would similarly access "OBJ4" from the child's network server 69. Since "OBJ4" is not resident at the child computer 66, this object would not be accessed through the name "/local machine/OBJ4". The next name in the ordered merge directory "/local network/OBJ4", however, has an object binding to the child network server 69 when the process is remotely executed at the child computer 66. Since "OBJ4" is resident at the child's network server 69, the object would be accessed from that site. During local execution of a process at the parent computer 62, the name "/local machine" has an object binding to the parent computer 62, again the site of execution. Similarly the name "/local network" has an object binding to the parent's network server 65 during local execution of a process at the parent computer 62. Accordingly, "OBJ1" would be accessed from the parent computer 62 and the object "OBJ4" would accessed from the parent's network server 65 during local execution of a process at the parent computer 62.

Figure 4B:
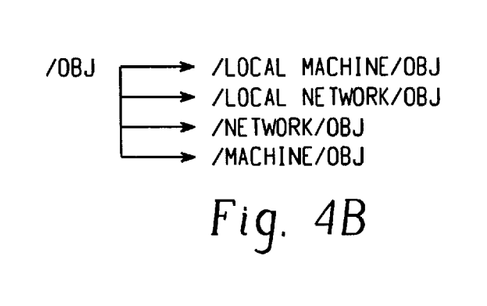

When objects are not resident at the remote site of process execution, or at the child's network server, the remaining names in the ordered merge directory are employed to provide access to the object. Since the name "/network" always points to the first network server 65 of the parent computer 62, a process executed remotely at the child computer 66 would access "OBJ5" from the parent's network server 65 through the name "/network/OBJ5" in the ordered merge directory. Note "OBJ5" is not resident at the child's network server 69. Similarly since the name "/machine" always points to the parent computer 62, a remotely executed process would access "OBJ3" from the parent computer 62 through the name "/machine/OBJ3". Note the object "OBJ3" is not resident at any other site than the parent computer 66. From the foregoing it can thus be seen that use of the ordered merge directory with names having object bindings that are process site dependent provides a method of accessing objects either from the site of remote execution or from sites proximate to the site of process execution.

Figure 5:
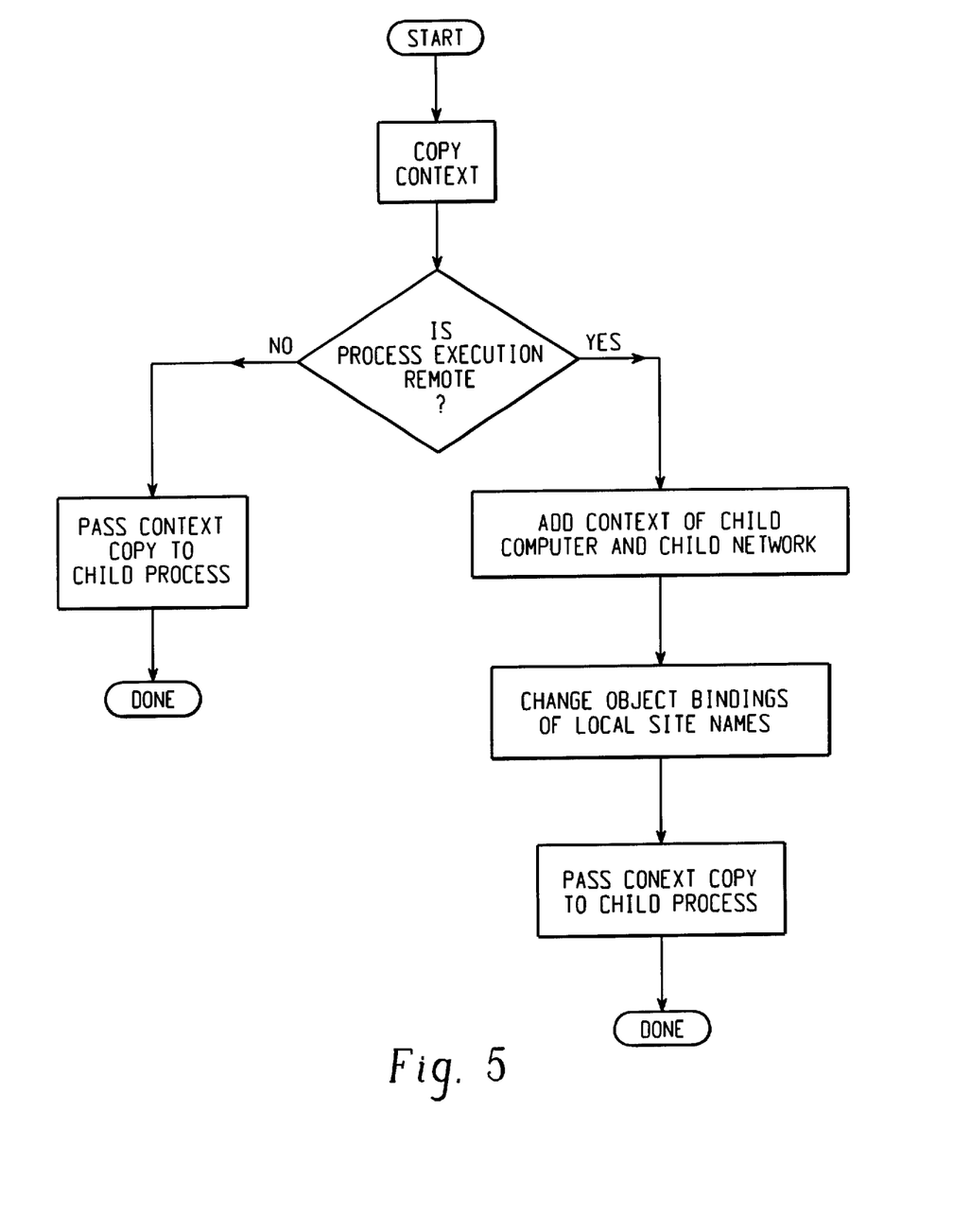
FIG. 5 is a flow chart illustrating an exemplary implementation of the present invention.

The present invention may be implemented in a variety of different ways, including for example by an execution server operating with a per-process naming scheme. Though illustrative, the present invention should not be viewed as being limited to this approach. Referring to FIG. 5, there is shown a flowchart of the steps that would be performed by an execution server in accordance with the present invention. When a process is to be executed, a copy of an existing context is made. The process to be executed is termed the child process and the copy of the existing context is termed the child context. A determination is then made as to whether execution of the child process is to be made locally at the parent computer or remotely at a child computer. If execution of the child process is to occur locally, then the child context is simply passed on to the child process, and the child process is executed. If execution of the child process is to occur remotely at a child computer, then changes are made to the child context before it is passed on to the child process. These changes include the addition of the context for the child computer and, if present, the context of the child's network server. Additionally, in accordance with the present invention, the object bindings of certain site dependent name are changed to point to the child computer and, if present, the child's network server.

Figure 6A:
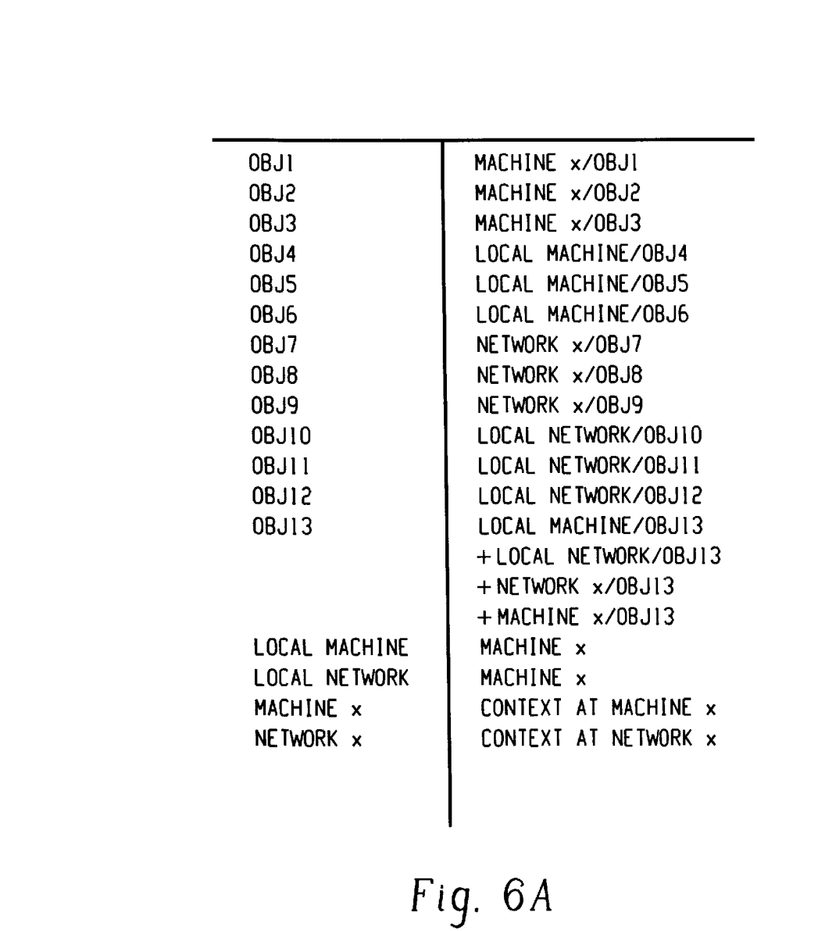
FIG. 6A is an exemplary parent context.
Figure 6B:
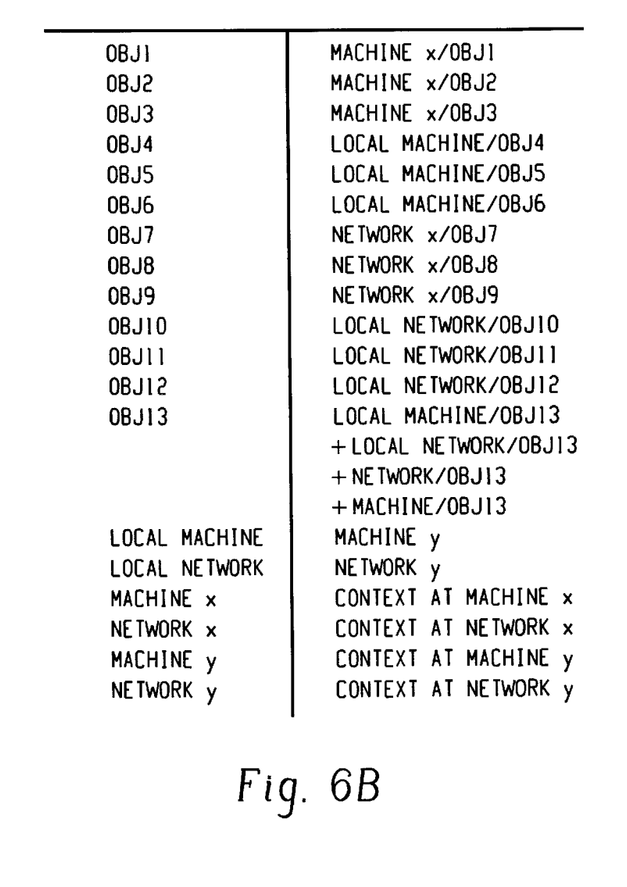
FIG. 6B is a copy of the parent context illustrated in FIG. 6A and altered in accordance with one embodiment of the present invention.

For further clarification, FIG. 6A illustrates an exemplary parent context and FIG. 6B illustrates the changes made in the child context before it is passed on to a child process that is being remotely executed. For purposes of this example the parent computer may reside in one network and the child computer may reside in a separate network. The parent context shown in FIG. 6A includes a set of objects "OBJ1", "OBJ2" and "OBJ3" that reside only at the parent computer along with a set of generic objects "OBJ4", "OBJ5" and "OBJ6" that reside at both parent and child computers. For purposes of this example the parent context also includes a set of objects "OBJ7", "OBJ8" and "OBJ9" resident only at a server of the parent computer and a set of network generic objects "OBJ10", "OBJ11" and "OBJ12" resident at both the servers of the network including the parent computer and at the network including the child computer. An additional object "OBJ13" may reside at any or all of the parent and child computers or the respective network servers of the parent and child computers.

In accordance with the invention the generic objects resident at both the parent and child computers are symbolically linked to local processor site name. This local processor site name has an object binding that is changed depending on the site of process execution. Thus, for example, a generic object such as "OBJ4" is symbolically linked to the local processor site name "LOCAL MACHINE". Similarly, network generic objects are symbolically linked to a local network site name having an object binding that is changed depending on the network site of process execution. For example a network generic object such as "OBJ7" is symbolically linked to the local network site name "LOCAL NETWORK/OBJ7".

As shown in FIG. 6A, the local processor site name "LOCAL MACHINE" and the local network site name "LOCAL NETWORK" are respectively bound to the parent computer "MACHINE x" and the parent network server "NETWORK x". These names are in turn linked to the context of the parent computer and the parent server. As mentioned above, if the child process is executed at the parent computer no changes to these object bindings of the local processor site name or the local network site name are necessary. The child context is therefore simply passed to the child process. If the process is executed remotely at the child computer, then in accordance with the invention the object bindings of the local processor site name "LOCAL MACHINE" and local network site name "LOCAL NETWORK" are changed to bind the local processor site name "LOCAL MACHINE" to the child computer "MACHINE y" bind the local network site name "LOCAL NETWORK" to the network server of the child computer "NETWORK y". The context of the child computer and its network are also added to the copy of the parent context, as shown in FIG. 6B. With the addition of the context for the child computer and its network, along with the changes in the object bindings of the local processor site name "LOCAL MACHINE" and the local network site name "LOCAL NETWORK" no further changes to the child context are required. This child context may then be passed to the remotely executing child process, as shown in the flowchart FIG. 5, and generic objects will be accessed from the child computer, if present, or from sites proximate the child computer.

The present invention has been shown to provide a great degree of flexibility in performing transparent and semi-transparent remote execution of computer processes. Modifications to the system services implementing remote execution are not required as new objects are added to the computer systems involved in the remote execution, as old objects are deleted, or as the names of objects are changed during distributed system development. The present invention can be employed in connection with remote execution between any two computers facilitating such execution, whether or not the computers belong to a network. The present invention can also be advantageously applied to remote process executions occurring between computers belonging to separate networks. The present invention can further be implemented without complete knowledge of the generic, semi-generic or non-generic character of objects required by a remotely executed process by using an ordered merge directory. Various modifications of the present invention will become apparent to those skilled in the art, after reviewing the teachings of the present disclosure, without departing from the spirit and scope of this invention. Therefore it should be understood that the embodiments discussed above have been set forth for the purposes of example only, and should not be taken as limiting the invention defined by the following claims. These claims are further to be read to include not only the combination of elements which are literally set forth, but all equivalent elements for performing substantially the same function in substantially the same way to obtain substantially the same result. The claims should therefore be understood to include not only that which is specifically illustrated and discussed above, but also that which is conceptually equivalent.

What is claimed is:

1. A method of selectively locally executing a process on a first computer, or remotely executing the process on a second computer upon initiation by the first computer, comprising the steps of:

(a) providing a first context on the first computer including object name bindings having a local machine name which is a symbolic link for specifying a computer on which execution is to be performed;

(b) providing a second context of object name bindings on the second computer;

(b) if the process is to be locally executed on the first computer, linking the local machine name to the first computer, and controlling the first computer to execute the process; and (c) if the process is to be remotely executed on the second computer, transferring the first context from the first computer to the second computer, adding the second context to the first context, linking the local machine name to the second computer, and controlling the second computer to execute the process.

2. A method as in claim 1, further comprising the steps, performed prior to step (a), of:

(d) storing a plurality of first objects corresponding to the name bindings of the first context on the first computer; and (e) storing a plurality of second objects corresponding to the name bindings of the second context on the second computer.

3. A method as in claim 2, in which at least one of the first objects is identical to at least one of the second objects.

4. A method as in claim 1, in which step (a) comprises providing the first context such that the object bindings further include a machine name which is a direct link to the first computer, the local machine name and the machine name being arranged in an ordered merge list in which the local machine name has higher priority than the machine name.

5. A method as in claim 4, in which:

the first computer is connected in a network; and step (a) further comprises providing the first context such that the object bindings further include a local network name which is a symbolic link for specifying a network in which a computer on which execution is to be performed is connected, the local network name being arranged in the order merge list.

6. A method as in claim 5, in which step (a) further comprises providing the first context such that the object bindings further include a network name which is a direct link to the network, the network name being arranged in the ordered merge list.

7. A method as in claim 6, in which step (a) further comprises providing the first context such that the local network name has higher priority than the network name in the merge list.

8. A method as in claim 7, in which step (a) further comprises providing the first context such that the local machine name has higher priority than the local network name, and the network name has higher priority than the machine name in the ordered merge list.

9. A computer system including a first computer and a second computer which are connected such that a process can be selectively locally executed on the first computer, or remotely executed on the second computer upon initiation by the first computer, comprising:

a first context provided on the first computer including object name bindings having a local machine name which is a symbolic link for specifying a computer on which execution is to be performed; and a second context of object name bindings provided on the second computer; in which the first computer is configured to, if the process is to be locally executed on itself, link the local machine name to itself and execute the process; and the first computer is further configured to, if the process is to be remotely executed on the second computer, transfer the first context from itself to the second computer; the second computer being configured to add the second context to the first context, link the local machine name to itself, and execute the process.

10. A system as in claim 9, further comprising:

a plurality of first objects corresponding to the name bindings of the first context stored on the first computer; and a plurality of second objects corresponding to the name bindings of the second context stored on the second computer.

11. A system as in claim 10, in which at least one of the first objects is identical to at least one of the second objects.

12. A system as in claim 9, in which the object bindings of the first context further include a machine name which is a direct link to the first computer, the local machine name and the machine name being arranged in an ordered merge list in which the local machine name has higher priority than the machine name.

13. A system as in claim 12, further comprising a network in which the first computer is connected, in which:

the object bindings of the first context further include a local network name which is a symbolic link for specifying a network in which a computer on which execution is to be performed is connected, the local network name being arranged in the ordered merge list.

14. A system as in claim 13, in which the object bindings of the first context further include a network name which is a direct link to the network, the network name being arranged in the ordered merge list.

15. A system as in claim 14, in which the local network name has higher priority than the network name in the ordered merge list.

16. A system as in claim 15, in which the local machine name has higher priority than the local network name, and the network name has higher priority than the machine name in the ordered merge list.

* * * * *